A. RAUH.
Pistol-Sword.
No. 52,504. Patented Feb. 6, 1866.
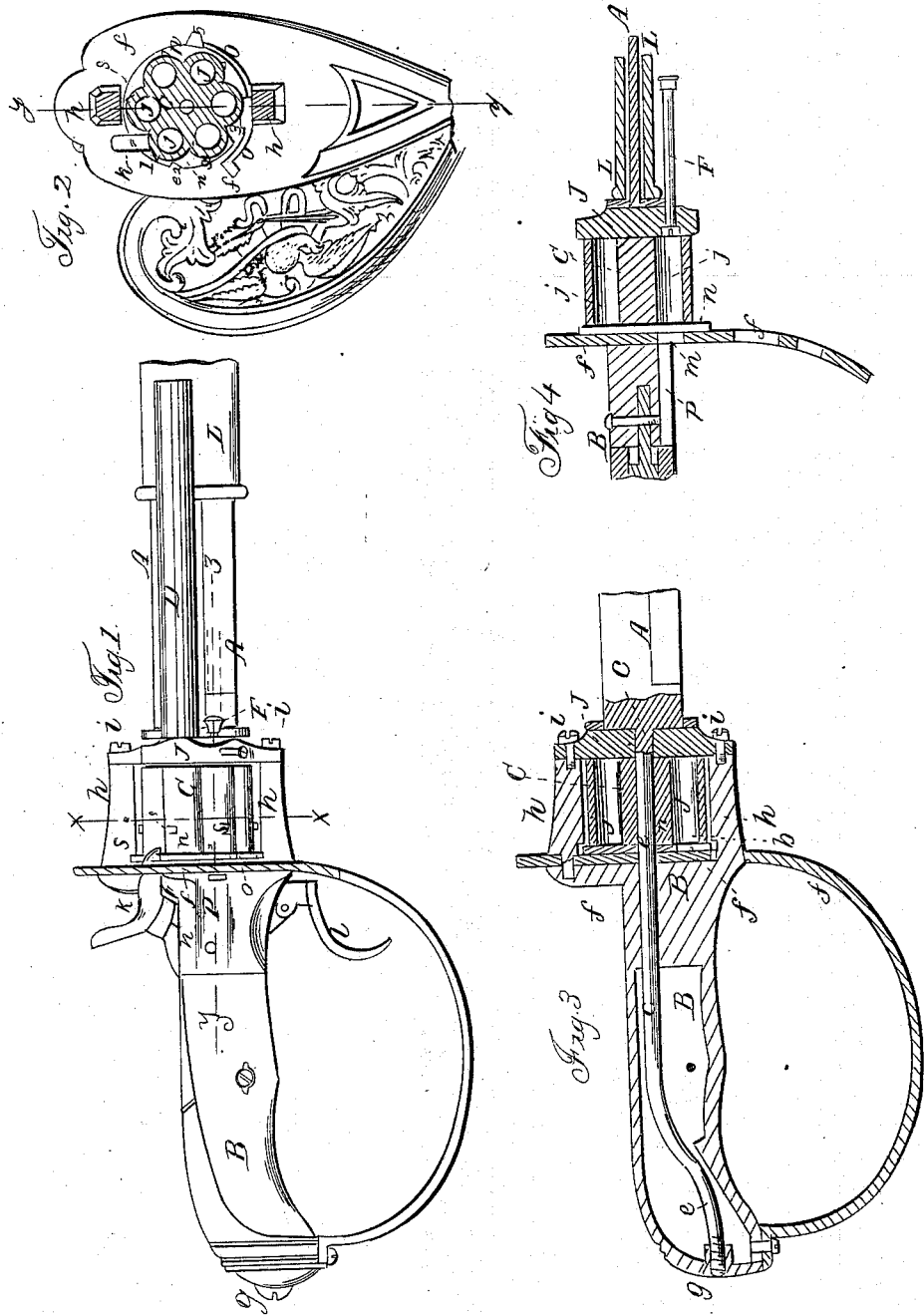

UNITED STATES PATENT OFFICE.

AUGUST RAUH, OF SOLINGEN, PROVINCE OF WESTPHALIA, PRUSSIA.

IMPROVEMENT IN COMBINED SWORD AND PISTOL.

Specification forming part of Letters Patent No. 52,504, dated February 6, 1866.

*To all whom it may concern:*

Be it known that I, AUGUST RAUH, of Solingen, in the province of Westphalia, in the Kingdom of Prussia, have invented certain new and useful Improvements in the Weapon known as a "Combined Sword and Pistol;" and I do hereby declare that the following is a full and exact description thereof, reference being had to the accompanying drawings, making part of this application.

My invention relates to a novel method of constructing a combined sword and pistol, and has for its objects to attain effectiveness, readiness of operation, strength, durability, and symmetry of form; and to these ends my invention consists in the employment, in combination with a sword-blade and its handle, of a revolving (many-chambered) cylinder arranged immediately in the rear of the blade and a barrel arranged at one side of the blade, as will be hereinafter more fully explained; and my invention further consists in forming the blade with a shank extending centrally from its rear end, and hanging the revolving cylinder on said shank, so that the revolving cylinder will have its axis coincident with a line running longitudinally from the center of the blade, as hereinafter more fully described; and my invention further consists in forming the guard and handle with a hole and depression to admit of the insertion and extrication of the cartridge-case, in combination with an oscillating breech-plate and a cartridge-extractor, all constructed and operating as will be presently explained; and my invention further consists in so constructing the breech-plate as that it shall constitute also a stop or rest to support the hammer, as hereinafter described.

To enable those skilled in the art to make and use my invention, I will proceed to describe its construction and operation, referring by letters to the accompanying drawings, forming part of this specification, and in which—

Figure 1 is a side elevation of my improved combined sword and pistol, showing the scabbard partially removed and the blade as if broken off to admit of the parts on the sheet full size. Fig. 2 is a cross-section at the line $x\ x$, Fig. 1, looking in the direction indicated by the red arrow. Fig. 3 is a partial longitudinal section at the line $y\ y$, Fig. 2; and Fig. 4 is a partial horizontal section at the line $z z$, Fig. 1.

In the several figures of the drawings the same part is indicated by the same letter of reference.

A represents the blade of a sword of any size and shape desired, and B its handle. C is the many-chambered rotating cylinder, and D the barrel through which the charges of the rotating cylinder are fired.

The blade A is formed with a round shank, $e$, extending back from its butt or rear end and slightly bent downward at its extremity, as seen at Fig. 3. This shank has arranged upon or around it, first, a shield-plate, J, then the rotating cylinder C, and, finally, the handle B of the sword, which latter is secured to it by a screw at $g$.

The handle B is formed with two stands or studs, $h\ h$, which extend forward through two holes in the guard $f$, above and below the rotating cylinder C, and to the forward ends of which is secured by means of screws $i\ i$ the shield-plate J.

The rotating cylinder is made with a series of chambers, $j\ j$, arranged around its axis in the usual manner, and is rotated automatically by a suitable lock-work, operated wholly by the trigger, after the fashion of a self-cocking pistol, with which those skilled in the manufacture of fire-arms are familiar. $k$ is the cock or hammer, and $l$ the trigger.

L is the scabbard, which is made in the usual form, except that it has an indentation or depression for a short distance along one side to accommodate the barrel D.

F is the cartridge-extractor or the rod for forcing out through the rear of the cylinder the empty cartridge-cases. This rod is arranged to slide freely through its bearings in the shield-plate J, and by being pressed backward with the thumb or finger forces the empty cartridge-cases out through the hole at $m$ in the guard $f$. (See Fig. 4.)

$n$ is the oscillating breech-plate. This plate $n$ (about circular in its contour) is hung to turn freely on the shank or base-pin $e$, and is provided with a spring-catch, $o$, by which it is operated and held in its different positions. Said plate $n$ is formed with two notches on its edge or periphery at 1 2, and an opening through it, as seen at 3, (partially dotted lines.) (See Fig. 2.)

The plate $n$ and spring-catch $o$ are provided with projections 4 5, which form stops to lock the plate $n$ in position; and the cylinder C may be formed with projections $s$, to facilitate its rotation by hand in loading and extracting the empty cartridge-cases.

The handle B is formed with a slight groove at $p$, (see Figs. 1 and 4,) to allow of the ready insertion of the cartridge.

The several parts being constructed and put together as shown and described, the operation of the whole will be as follows, viz: The rod F being drawn out or forward into the position shown in red lines at Fig. 1, and the plate $n$ being turned around and locked, by means of the spring-catch $o$, in such a position as to support the hammer $k$ in its notch 2 clear of the cylinder, the chambers are supplied with cartridges, one at a time, by passing them in from the rear through the groove $p$ and hole $m$ while turning the cylinder by hand to bring the chambers in succession opposite the hole $m$. The breech-plate $n$ is then turned around into the position shown at Fig. 2, and there locked, whereby the hole $m$ in guard $f$ is closed over and the hammer $k$ allowed to descend into the position necessary for exploding the cartridges.

The weapon is now ready for use, the pistol being brought into action, when desired, by simply pressing on the trigger C, in the same manner as necessary with other self-cocking fire-arms. After the charges of the cylinder have been exploded and it is desired to reload, the hammer $k$ is slightly raised and the plate $n$ turned round into the position in which it was before described, previous to loading. The cylinder is then turned round by hand and the rod F forced along or backward successively into each of the chambers $j$ thereof, whereby the empty cartridge-cases are forced out through the rear ends of said chambers, (passing out at the hole $m$ in guard $f$ and falling to the ground,) when the cylinder may be reloaded for use again.

It will be seen that by the arrangement of the cylinder back of the blade and the barrel at one side, as described, all the advantages of a repeating fire-arm are gained, while at the same time the whole weapon is at once light, strong, and readily aimed and operated during action; and it will be understood that by forming the base-pin upon which the cylinder rotates on the blade itself the construction is rendered strong, simple, and durable.

By having the chambers of the cylinder bored clear through and combining therewith the oscillating breech-plate, as described, and making the guard $f$ with a hole, as explained, the arm is rendered capable of being most readily loaded with the fixed ammunition, (or metallic cartridges,) and by the employment of the extractor F the empty cases are easily removed from the chambers of the cylinder.

The breech-plate $n$, it will be observed, performs the double function of closing over and opening the passage, through which the cartridge-cases are inserted and discharged and of supporting the hammer so that the cylinder can be rotated by hand, as explained.

I do not propose to limit myself to any precise details in the forms or sizes of the parts, or to any peculiarities of cylinder-barrel, lock-work, or blade other than those essential to carry out my invention.

Having fully described the construction and operation of my invention, what I claim as new, and desire to secure by Letters Patent, is—

1. The combination, with the sword-blade and its handle, of a many-chambered rotating cylinder and fixed barrel, when the base-pin for the cylinder is formed of the blade-stock and the several parts are arranged and operate as hereinbefore described.

2. The constructing and arranging the breech-plate $n$ so as to constitute also a hammer-supporter during the loading operation, substantially as described.

In testimony whereof I have hereunto set my hand and seal this 26th day of April, 1865.

AUGUST RAUH. [L. S.]

Witnesses:
CARL SPARLEDER,
HERMANN VON FLOEGEN.